W. E. G. CHIPPINDALE.
COMBINATION STOVE.
APPLICATION FILED MAR. 8, 1918.
1,369,758. Patented Feb. 22, 1921.
3 SHEETS—SHEET 3.
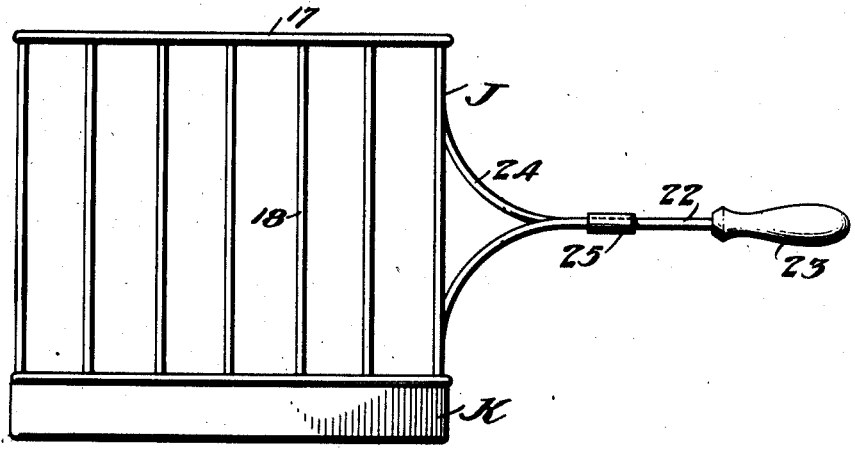
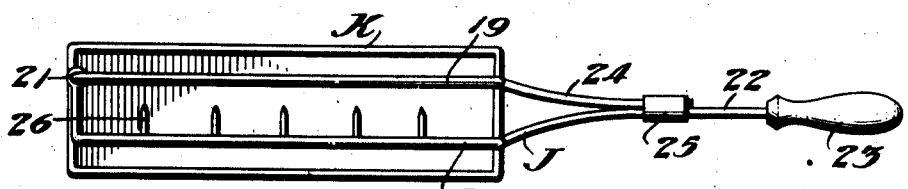
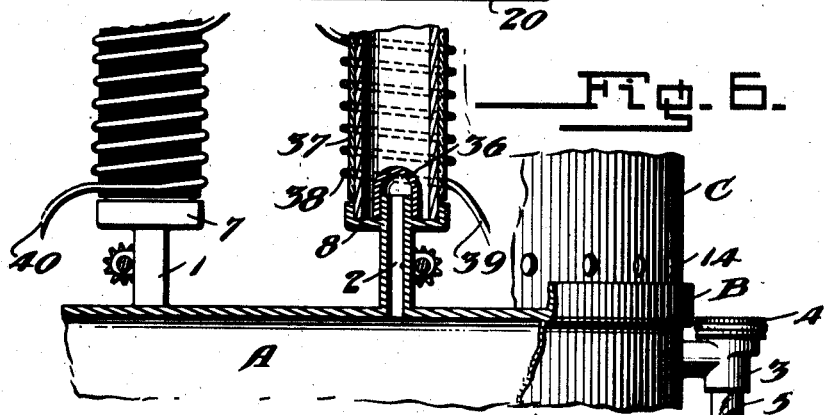
William E. G. Chippindale

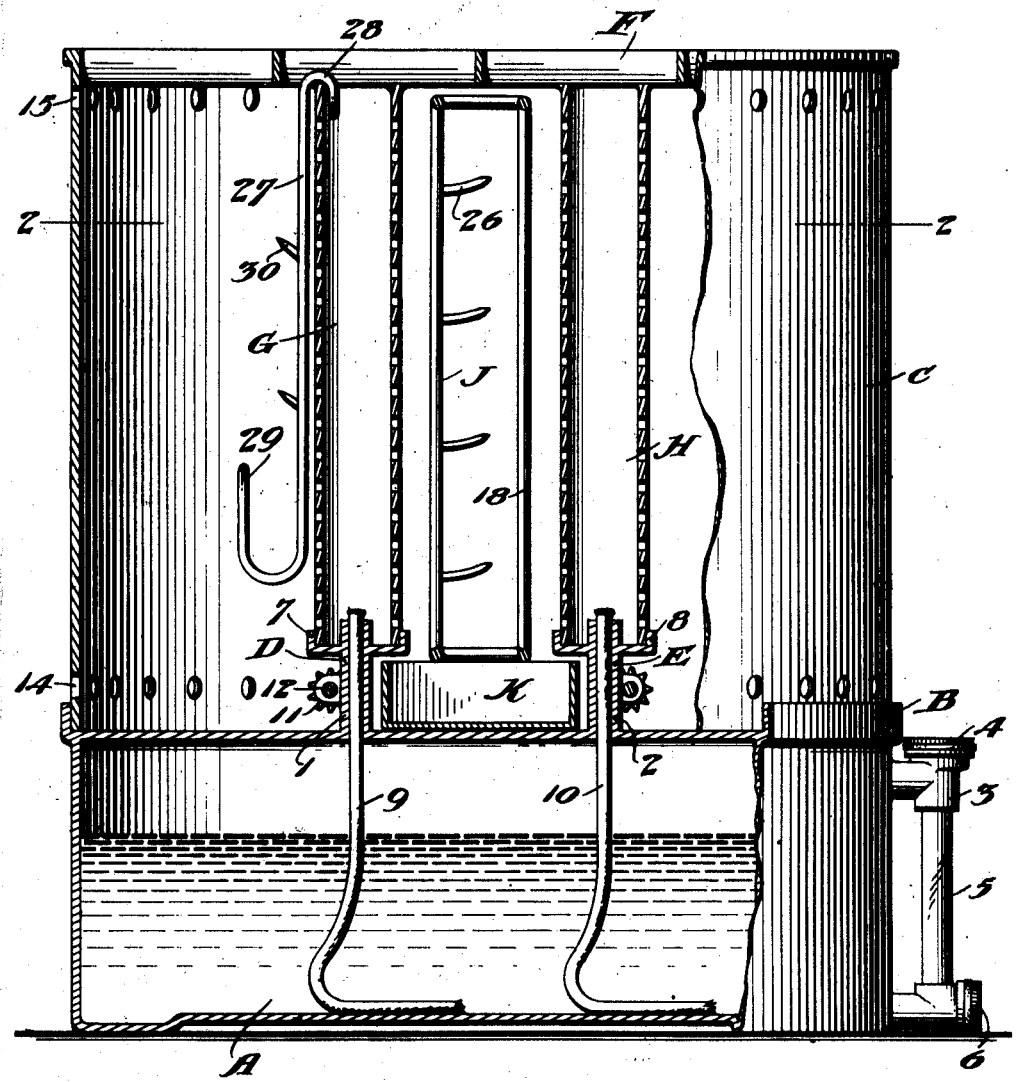

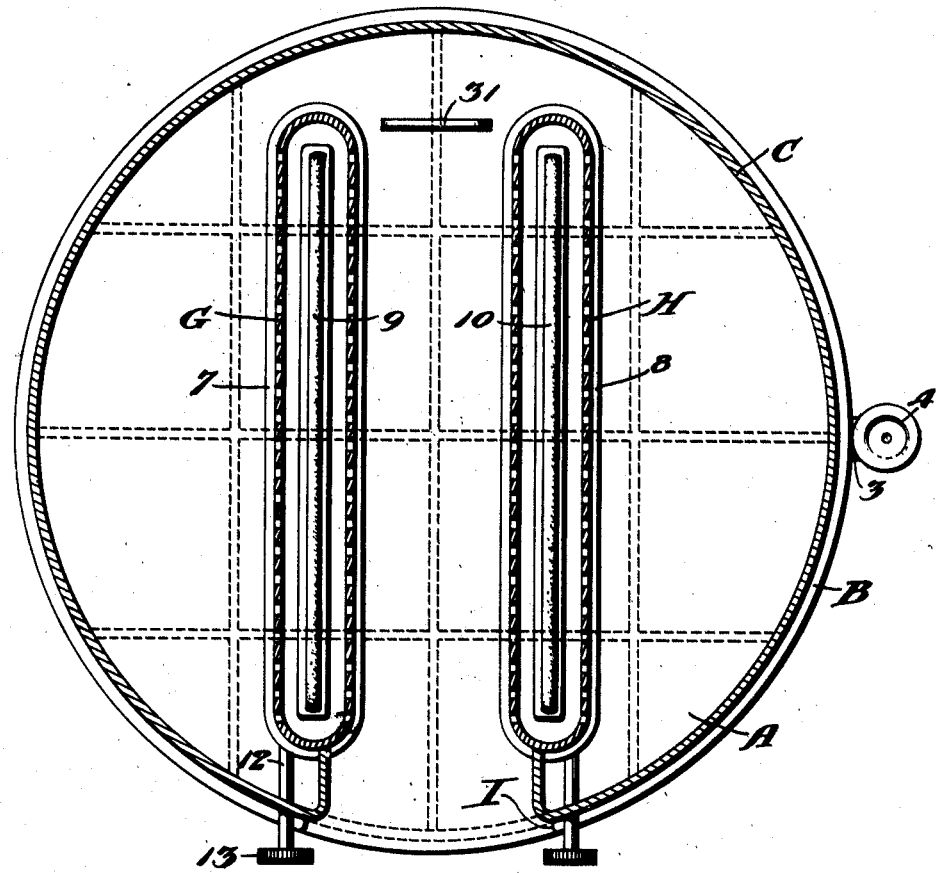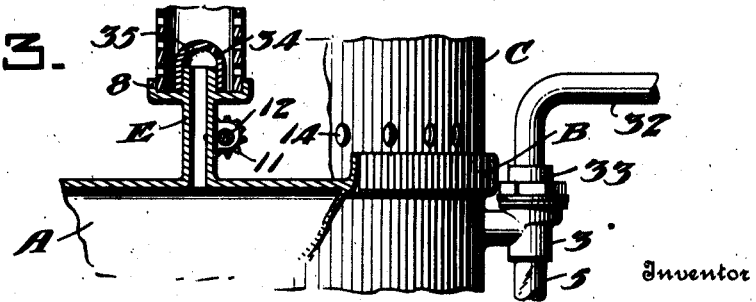

UNITED STATES PATENT OFFICE.

WILLIAM E. G. CHIPPINDALE, OF KINCARDINE, ONTARIO, CANADA.

COMBINATION-STOVE.

1,369,758.  Specification of Letters Patent.  Patented Feb. 22, 1921.

Application filed March 8, 1918. Serial No. 221,268.

*To all whom it may concern:*

Be it known that I, WILLIAM E. G. CHIPPINDALE, a citizen of Canada, and a resident of Kincardine, in the county of Bruce and Province of Ontario, in the Dominion of Canada, have invented a certain new and useful Improvement in Combination-Stoves, of which the following is a specification.

My present invention relates to a combination stove, and more particularly to a device of this character intended for general utility, and to be utilized where different kinds of heating energy are available.

The principal object of my invention is to provide a stove which can be used as a toaster and which will at the same time take a pot, pan, or other cooking utensil, or which might have an oven fitted thereto, thus permitting full utilization of the heat as generated.

A further object resides in providing a structure, which while primarily constructed to be used with oil as a fuel, can be converted to burn natural or artificial gas and can also have a heating element fitted in conjunction therewith to use electric current.

Another object is to provide a wire rack adapted to receive and hold bread to be toasted, meat to be broiled, or other food stuffs which are to be cooked by being directly subjected to the heat of the stove, which rack can be fitted to have the heat directed against both sides of the food stuff and will be held in a proper centered position to insure equal distribution of the heat, a pan being provided in conjunction with the rack to catch meat drippings and the like.

Further objects of my invention will appear in the following detailed description, taken in conjunction with the accompanying drawing, forming a part of this specification, and in which drawings, Figure 1 is a view in vertical section through a stove constructed after the manner of my invention.

Fig. 2 is a horizontal sectional view taken on the line 2—2 of Fig. 1.

Fig. 3 is a fragmentary view showing the structure fitted for the use of gas as a fuel.

Fig. 4 is a view in side elevation of the food holding rack adapted for use with the stove structure.

Fig. 5 is a top plan view of the structure disclosed in Fig. 4.

Fig. 6 is a view somewhat similar to Fig. 3 but illustrating the adaptation of the invention for the use of electricity to accomplish the generation of heat.

In the drawings, where similar characters refer to similar parts throughout the views, A designates a fuel tank, which is constructed much after the manner of the oil tanks as ordinarily incorporated in kerosene and other oil burning stoves. This fuel tank A has a rim B provided around the upper edge thereof and a drum or casing C is held in place by this flange, it of course being understood that the drum or casing is removable. The fuel tank acts also as a lamp base for the support of the burners D and E, and a grid F formed in conjunction with the drum or casing C has perforated chimneys G and H carried thereby to fit over the flame from the burners as the drum or casing is disposed to be held upon the fuel tank A by the flange B. As is shown in Fig. 2, the drum or casing C is left open at I throughout a space representing substantially the distance between the burners D and E, and a rack J, the construction of which is better shown in Figs. 4 and 5, is adapted to be shoved through this opening I to be disposed between the chimneys G and H provided for the burners D and E. A pan K is associated with the rack J, and this pan acts as a support for the rack, and also to center the same between the flues or chimneys G and H, substantially as shown in Fig. 1.

The fuel tank A is made as a closed container, open only through the wick tubes 1 and 2 of the burners G and H, and a filling tube 3 is provided for the tank, this tube being closed by a top 4. As is shown in Fig. 1, the filling tube has the intake opening thereof disposed adjacent the top of the tank A, and a section of glass tube or other transparent tube is introduced as shown at 5 so that the height of the oil within the tank can be readily ascertained at all times. To allow for draining of the tank, where oil is used as a fuel, a drain opening is provided which is closed by the cap 6.

The wick tubes 1 and 2 of the burners D and E act as supports, and flanges 7 and 8 are carried adjacent the upper ends thereof to form cups in which the flues or chimneys G and H are seated when the drum or casing C is fitted in place. The wicks 9 and 10 are fitted to the tubes, and star-wheels 11 carried by the shafts 12 are provided to adjust the wicks, heads 13 provided on these shafts 12 being milled or knurled so that the shafts may be more readily turned in accomplishing the desired adjustment of the wicks. The drum or casing C has a row of perforations 14 adjacent the bottom edge thereof and a second row of perforations as indicated at 15, adjacent the upper edge so that free circulation of air is permitted through the casing, and then by reason of the fact that the perforations 16 are formed through the flues or chimneys throughout their entire lengths, a proper supply of air to the burners is provided for and at the same time the heated air and gases are free to pass into the drum or casing. It will of course be understood that where the grid or grill is uncovered, air circulation will be directed through this grid or grill, but where a large pot, pan, or the like, is placed upon the grid or where a cover is placed over the top of the drum, the circulation will be entirely through the perforations of the casing or drum and of the chimneys.

As has been stated, the drum or casing C has an opening provided at I, in the forward side thereof, and the rack J having the pan K formed in conjunction therewith is to be inserted through this opening to be disposed between the flues or chimneys G and H. This rack is made up of frame portions 17 which have the upright bars 18 connected therebetween, the rack as an entirety being made in two parts which are generally designated at 19 and 20. These two parts 19 and 20 are hingedly connected together as shown at 21, and a stem 22 extending from one of the members has a handle 23 mounted thereon by which the rack is conveniently held and by which it is supported when being placed within the stove and removed. The remaining member of the rack has a stem extension 24, which is of less length than the stem extension 22, and a sleeve 25 is mounted slidably upon the stem 22 to be moved to embrace the stem extension 24, when the two rack portions are closed together and to thus hold these portions in the relation shown in Fig. 5. Pins 26 are provided on the upright bars 18 of one or both of the portions 19 and 20, and thus as bread, meat, or other food stuffs are placed between the side portions of the rack and these side portions are closed together, the food stuffs will be held and supported in the relation in which it has been placed. The rack is made of such width, and the burners are so disposed, that as the rack is inserted through the opening I of the casing or drum, the sides thereof will be disposed closely adjacent the inner sides of the flues or chimneys G and H, and the heat escaping through the perforations of these tubes will come in direct contact with the food stuffs. Further, as the flame is confined entirely within the flues or chimneys, these parts, which will be of metal, will be entirely heated and the heat given off thereby will act upon the food stuffs carried by the rack. While the rack portion might be set directly upon the top of the fuel tank, it is preferable that a wider base be given for the support thereof and also that provision be made for the catching of meat drippings and the like. With this in mind, I provide the pan K, which is made of slightly greater width than the rack, and which is secured in conjunction with one of the portions of the rack, it of course being understood that the remaining portion will be free of the pan and will be thus capable of swinging movement so that the rack may be opened. By this arrangement of the parts, it will be appreciated that the pan K is also carried by the handle 23, and as the pan increases the weight at the bottom of the rack, it is assured that when the rack is being lifted through the use of the handle 23, the contents of the pan will not be spilled. By reason of the fact that the flanges 7 and 8 of the burners extend out from the wick tubes 1 and 2, the extension of the pan K beyond the sides of the rack J is accommodated.

The rack J provides for the support of foodstuffs only between the chimneys or flues G and H, and as the chimneys will radiate heat on their outer sides, it is perhaps preferable that racks 27 be provided to be supported as shown in Fig. 1. As illustrated, the rack 27 has a supporting hook 28 at one end to be caught over the upper edge of the flues, and at the lower end has a hook formation as indicated at 29 so that bread or the like, placed within the rack to be toasted on the outer sides of the chimneys will be supported, spurs 30 being also provided to receive and hold foodstuffs. It will of course be appreciated that the racks 27 might be hung to be suspended at any desired point, and, that these racks might perhaps be used on the inner sides of the chimneys or flues, and also the rack J might be used in the cooking of foodstuffs of different characters, in which adaptation one character of food might require more severe heat than the other, and under these circumstances the rack J would be inserted only part way within the space between the flues or chimneys of the burners, however, where the rack is to be entirely inserted, the stop 31 will limit the inward movement thereof.

In use of the stove structure, the casing or drum C is removed and as the chimneys G and H are carried thereby direct access can be had to the flame ends of the wicks 9 and 10. The burners are lighted and then when the casing or drum is again placed to be held by the rim flange B, the chimneys will be relocated with their lower ends held by the flanges 7 and 8. The burners will take their supply of oil or other fuel from the tank A, and as there is free circulation of air through the perforations of the drum and of the chimneys, a very efficient stove structure will be provided due to the fact that the heat is confined by the drum and that the chimneys not only allow for escape of heated air which has passed the burners, but are themselves heated and subsequently radiate this heat. Foodstuffs which are to be toasted, broiled, or cooked in a like manner will be placed to be held by the rack J or by racks 27, and by placing a cooking utensil upon the top of the stove to be supported by the grid, food can be cooked by boiling, or an oven might be fitted at this point to permit baking.

In Fig. 3, I have illustrated the arrangement of the parts for the use of the stove with artificial or natural gas, and as here shown the cap 4 is removed from the filling opening of the tube 3 and a gas supply pipe 32, leading from a suitable source of supply and controlled by a valve of ordinary construction, is connected in the filling opening by means of a union or coupling 33. The wicks are removed from the wick tubes, and burner caps 34, which have the double row of perforations 35, are fitted upon the extensions of the wick tubes which project within the chimneys. It will of course be understood that the gas passages or openings 35 will be disposed slightly angularly outwardly so that the flame will be directed against the chimneys or flues to heat the same, and by regulation of the valve in the pipe 32, the intensity of the flame can be varied. As gas from the pipe 32 is supplied to the fuel tank A, and this fuel tank is full at all times, an even gas flow will be maintained at the burner cap 43 even though there may be fluctuations in the supply through the pipe 32. It will of course be understood that where gas is to be used as the combustible fuel, the tank A will ordinarily be drained, and this can be done by removing the cap 6, although perhaps under some circumstances it may be desirable to retain oil within the tank A to enrich the gas as supplied, and it might even be found in practice that a volatile liquid could be supplied to the tank A and that air under pressure might be forced through the liquid to form gas to supply the burners, however as my invention resides primarily in the stove structure I shall not here go more into detail in this respect.

In Fig. 6 of the drawing, I have illustrated yet another modified construction, and as here shown, the wick tubes have the closing caps 36 inserted thereto to cut off communication from the fuel tank A. Sleeves 37, which are of mica or some other suitable insulating material and are shaped to conform substantially to the outer lines of the flues or chimneys G and H, are provided with coil windings as indicated at 38, of a high resistance wire so that as electric current is supplied through the circuit wires 39 and 40 leading to and from a suitable source of supply, the coil windings will be heated, and the heat will be radiated much after the manner where the stove is used with oil or gas as a fuel. In this use of the stove, the liquid fuel might be retained in the fuel tank, but it is perhaps preferable that the tank be drained.

From the foregoing it will be seen that I have provided a stove structure which is of such character that it may be installed primarily for use with gas as a fuel or to use electric current, and then in case of failure of the supply can be used with equally good results as an oil burner, and which stove structure can be purchased by a householder who is a tenant by rent with the assurance that if the house be later supplied with gas or electricity, or he move to a house in which these are not available, the stove can still be used. Further, the combination stove structure particularly commends itself to parties who are traveling and to others who are apt to meet with various conditions of fuel supply.

Changes in details may be made without departing from the spirit or scope of my invention; but,

I claim:

1. A combination stove including a fuel tank, wick tubes carried by said tank and having outstanding flanges adjacent the upper ends thereof, a drum to be fitted upon the fuel tank, chimneys carried by said drum located to have the lower ends thereof received by the flanges of the wick tubes when the drum is fitted in place, a filling tube leading to said fuel tank adapted to have a gas supply pipe connected thereto, and burner caps to be removably fitted over the open ends of said wick tubes.

2. A combination stove including a tank forming a base, wick carrying burner tubes extending upwardly from said tank and having outstanding flanges adjacent the tops thereof, a drum adapted to be mounted upon the tank, chimneys carried by said drum to fit to the flanges of the burner tubes as the drum is mounted in place, insulating members to be fitted to said chimneys, and coil windings carried by said insulating members and connected with an electric circuit.

3. A combination stove including a fuel tank, wick tubes carried by said tank, and having outstanding flanges adjacent the upper ends thereof, a drum to be fitted upon the fuel tank, chimneys carried by said drum located to have the lower ends thereof received by the flanges of the wick tubes when the drum is fitted in place, a filling tube leading to said fuel tank adapted to have a gas supply pipe connected thereto, burner caps to be removably fitted over the open ends of said wick tubes, said drum having an opening through the side thereof, and a rack to be fitted through said opening to be disposed between the chimneys.

4. A combination stove including a tank forming a base, wick carrying burner tubes extending upwardly from said tank and having outstanding flanges adjacent the tops thereof, a drum adapted to be mounted upon the tank, chimneys carried by said drum to fit to the flanges of the burner tubes as the drum is mounted in place, insulating members to be fitted to said chimneys, coil windings carried by said insulating members and connected with an electric circuit, said drum having an opening through the front thereof, and a rack to be fitted through said opening and thus disposed between the coils carried by the chimneys.

WILLIAM E. G. CHIPPINDALE.